US005115253A

United States Patent [19]

Yorozu et al.

[11] Patent Number: 5,115,253

[45] Date of Patent: May 19, 1992

[54] METHOD FOR DRIVING AND CONTROLLING A THERMAL PRINTER

[75] Inventors: Hideki Yorozu; Akihiro Takeuchi, both of Iwate, Japan

[73] Assignee: Alps Electric Co., Ltd., Tokyo, Japan

[21] Appl. No.: 593,912

[22] Filed: Oct. 5, 1990

[30] Foreign Application Priority Data

Oct. 27, 1989 [JP] Japan ................................ 1-280850
Oct. 31, 1989 [JP] Japan ................................ 1-283987
Oct. 31, 1989 [JP] Japan ................................ 1-283988

[51] Int. Cl.$^5$ ........................................ G01D 15/10

[52] U.S. Cl. ............................ 346/76 PH; 400/185; 400/233

[58] Field of Search ............ 346/76 PH; 400/120 HE, 400/229, 185, 322, 328, 568, 569, 233, 230

[56] References Cited

U.S. PATENT DOCUMENTS 4,653,939 3/1987 Hibino ................................ 400/185
4,752,786 6/1988 Inoue et al. ......................... 400/185

FOREIGN PATENT DOCUMENTS 57-14059A 1/1982 Japan .
0172777 8/1986 Japan ................................ 400/185

*Primary Examiner*—Benjamin R. Fuller
*Assistant Examiner*—Nancy Le
*Attorney, Agent, or Firm*—Guy W. Shoup; B. Noel Kivlin

[57] ABSTRACT

The present invention relates to a method for driving and controlling a thermal printer. In the thermal printer provided with a carriage driving mechanism for moving a carriage including a thermal head forward and backward along a platen; a mechanism for moving upward and downward the thermal head to bring it into contact with and detach it from said platen; and a sheet forwarding mechanism for forwarding a print sheet in the direction perpendicular to the sheet forwarding direction; the time required for the printing operation by the printer is shortened as a whole and thus it is possible to raise the effective printing speed by controlling the drive of the printer so that the upward movement and/or the downward movement of the thermal head and the moving operation of the carriage or the sheet forwarding operation are effected, overlapped with each other.

9 Claims, 3 Drawing Sheets

METHOD FOR DRIVING AND CONTROLLING A THERMAL PRINTER

BACKGROUND OF THE INVENTION

1. Field of the Invention

The present invention relates to a method for driving and controlling a thermal printer effecting printing on a print sheet by means of a thermal head.

2. Description of the Prior Art

FIG. 5 shows an example of the thermal printer generally used. Almost at the central portion of a frame 1 of the printer there is disposed a plate shaped platen 2 so that its printing surface is almost vertical. Further before and under the platen 2 in the frame 1 stated above there is disposed a carriage shaft 3 so as to be parallel to the platen 2. Still further a flange shaped guiding portion 4 is formed at the front edge of the frame 1 and a rack 5 is formed at the inner edge of this guiding portion 4. A carriage 6 is mounted on the carriage shaft 3 and the guiding portion 4, movably forward and backward along the carriage shaft 3 and the guiding portion 4, driven by a motor engaged with the rack 5. A thermal head 7 is mounted at the extremity portion of the carriage 6 so as to be opposite to the platen 2 and a ribbon cassette (not shown in the figure) is mounted on the upper surface of the carriage, in which an ink ribbon is located, which ink ribbon is guided between the thermal head 7 and the platen 2 by the ribbon cassette.

Further, behind the platen 2, is formed a sheet insertion opening 8 for forwarding a sheet (not shown in the figure) before the platen 2. At a part of the sheet insertion opening 8 there is disposed a sheet forwarding roler 9, which is driven by a motor not shown in the figure to forward the sheet with a predetermined speed. Under this sheet forwarding roller 9 there is disposed rotatably a thrusting roller 10 thrust with pressure on this sheet forwarding roller 9 so that the sheet inserted through the sheet insertion opening 8 is held between the sheet forwarding roller 9 and this thrusting roller 10 to be forwarded.

FIG. 6 shows a prior art driving mechanism for the carriage and a prior art driving mechanism for the thermal head in such a printer. Within the carriage 6 there is disposed a carriage driving motor 11 and an output pinion 12 of this carriage driving motor 11 is engaged with the rack 5 through a gear 13 so that the carriage 6 is movable forward and backward along the carriage shaft 3 by the normal and reverse rotation of the carriage driving motor 11. On the platen 2 side of the carriage 6 a fixing member 14 for the thermal head 7 is mounted pivotably through a fulcrum 15 and the thermal head 7 is mounted at the extremity portion of this fixing member 14. One end portion 17*a* of a cam follower 17 formed in a bell crank shape and mounted rotatably around a fulcrum 16, acting as a driven joint is brought into contact with the fixing member 14 of this thermal head 7 and the other extremity portion 17*b* is engaged slidably with an endless cam groove 19 formed in a cam member 18 acting as a driving joint. An output pinion 23 of a motor 22 for moving upward and downward the thermal head mounted on the carriage 6 is engaged with a gear 20 formed on the outer periphery of this cam member 18 in one body therewith through a transmission gear 21 so that the cam member 18 is rotated by the rotation of the motor 22; the cam follower 17 is rotated, accompanied by this cam member 18; the fixing member 14 is thrust with pressure on the one extremity portion 17*a* of the cam follower 17 by the rotation of this cam follower 17 to be moved forward and backward with respect to the platen 2; and thus the operation of thrusting the ink ribbon and the recording sheet on the platen 2 by the thermal head 7 and removing them is carried out.

In addition, a motor for driving an ink ribbon rewinding bobbin 24 for rewinding the ink ribbon (not shown in the figure) is mounted also on the carriage 6, separately from the motor 22 described previously for moving the thermal head upward and downward and a rewinding gear 27 disposed coaxially to the ink ribbon rewinding bobbin 24 is engaged with an output pinion 25*a* thereof through a transmission gear 26. Further a sensor (not shown in the figure) for sensing the up- and downward movement of the thermal head is disposed and the movement of the ink ribbon rewinding motor 25 is controlled by this sensor, corresponding to the up- and downward movement of the thermal head 7.

In the prior art printer described above, the sheet is inserted through the sheet insertion opening and this sheet is put between the sheet forwarding roller 9 and the thrusting roller 10. In this way, the sheet is forwarded in the direction perpendicular to the movement direction of the carriage 6 by driving the sheet forwarding roller 9 so as to rotate it. On the other hand, the motor 22 for moving the thermal head upward and downward to thrust the thermal head 7 on the sheet with a predetermined thrusting force. In this state the motor 11 for driving the carriage is driven to move the carriage 6 and at the same time the ribbon rewinding motor 25 is driven to rotate the rewinding bobbin 24 and to rewind the ink ribbon in the ribbon cassette. In this way, desired printing is effected on the sheet by driving the thermal head 7, based on desired printing signals.

For the purpose of moving the thermal head 7 and controlling the ribbon rewind in the printer as described above, as disclosed in JP-P-62-9634-B, the thermal head is so controlled that it is moved while being thrust on the platen 2 by a predetermined distance after the point of time where the printing signal has been terminated, so that the ink ribbon is peeled off from the sheet and rewound completely and after the movement of the carriage 6 has been completely stopped, it is detached from the platen. Then in the state where the thermal head 7 is raised completely up from the platen 2, i.e. after the upward movement of the head is completely terminated, the motor 11 for driving the carriage is rotated in the reverse direction to return the carriage 6 to the home position thereof and at the same time the sheet forwarding roller 9 is rotated to forward the sheet by a predetermined distance in order to prepare the printing of the succeeding line. However, the prior art method for driving and controlling a thermal printer has a drawback in that it is unnecessarily inefficient with respect to printing speed. This inefficiency is a result of the practice of completing the upward or downward movement of the thermal head before initiating the sheet forwarding operation and/or the carriage advance/return operation. By delaying these operations until the thermal head is either completely raised or lowered, a short time delay is added to the time period required to print one line of text. The time delay increases the time necessary to print one line of text, and becomes significant when the time delays for each line are added over the period needed to print an entire page. This added time delay causes the ratio of actual printing time (i.e., the time during which the thermal head is in contact with and printing onto the printing sheet) to the total printing time (time spent printing a document) to decrease. This ratio is further increased when the line printed does not extend from margin to margin (i.e., a half line at the end of a paragraph).

SUMMARY OF THE INVENTION i The present invention has been made in order to solve the problems described above and to raise the effective printing speed.

Another object of the present invention is to provide a method for driving and controlling the thermal printer, by which the upward operation and/or the downward operation of the thermal head is overlapped with another operation.

Still another object of the present invention is to provide a method for driving and controlling the thermal printer, by which after the printing of one line has been terminated and before the upward operation of the thermal head is terminated, the carriage driving mechanism is driven to start the movement of the carriage (carriage movement operation) to the succeeding printing position.

Still another object of the present invention is to provide a method for driving and controlling the thermal printer, by which after the printing of one line has been terminated and before the upward operation of the thermal head is terminated, the sheet forwarding mechanism is driven to start the forwarding of the print sheet.

Still another object of the present invention is to provide a method for driving and controlling the thermal printer, by which the upward and/or downward movement of the thermal head is effected, while the moving operation of the carriage is executed.

By the method for driving and controlling the thermal head according to the present invention the upward movement and/or the downward movement of the thermal head is effected, overlapped with the moving operation of the carriage or the sheet forwarding operation, and therefore the time necessary for the printing operation of the printer is shortened as a whole.

DETAILED DESCRIPTION OF THE PREFERRED EMBODIMENTS

Figure 1:
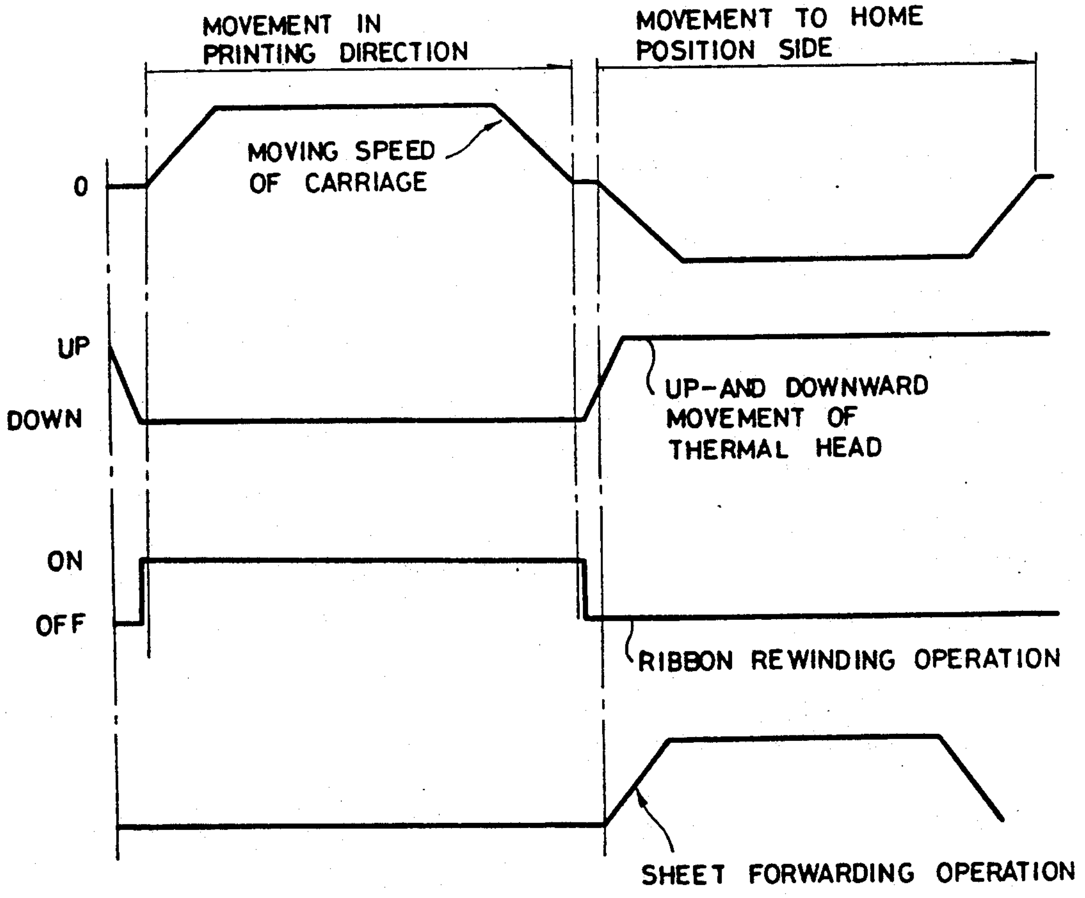
FIG. 1 is a scheme for explaining the operation timing of a first embodiment of the present invention.

Hereinbelow the method for driving and controlling a thermal printer according to the present invention will be explained, referring to the drawings.

FIG. 1 shows the first embodiment of the present invention, which is an example, in which the thermal printer is so driven and controlled that the upward movement of the thermal head (thermal head movement operation) and the returning movement of the carriage are overlapped with each other.

The operation timing of the printer in the present embodiment is as follows, as indicated in FIG. 1. At first, the motor 22 for the up- and downward movement of the thermal head is driven so that the thermal head 7 is thrust on the platen 2 with a predetermined pressure. In this state, while driving the motor 11 for driving the carriage (carriage movement operation) so that the carriage 6 is moved along the platen 2 and at the same time driving the ribbon rewinding motor 25 so as to rotate the rewinding bobbin 24 in order to rewind the ink ribbon in the ribbon cassette mounted on the carriage 6, desired printing is effected on the print sheet by driving the thermal head 7 on the basis of desired recording signals. At the point of time, where the last printing of one line is terminated, electrical current powering the motor 11 for driving the carriage is stopped so as to stop the forward movement of the carriage 6. Here, in the case where the current to the motor 11 for driving the stopped, since there is naturally a slow-down region for the motor, the carriage 6 is stopped at a position, where it is displaced by a predetermined distance from the point where the last current has flowed through the thermal head. (Up to this point the present method is identical to the prior art method for driving and controlling the thermal printer.) Therefore, the motor for the up- and downward movement of the thermal head is driven so as to effect the upward movement of the thermal head. However, before this upward movement is completely terminated, e.g. at the point of time where the thermal head 6 is separated from the print sheet, the motor 11 for driving the carriage is rotated in the direction reverse to that at the printing so that the movement of the carriage 6 to the succeeding printing position is started. Since the upward movement of the thermal head 7 is completely terminated during the returning operation of the carriage 6, after this upward movement has been terminated, the sheet forwarding roller 9 is driven so as to forward the print sheet by a predetermined distance. In this way, the forwarding of the sheet and the returning operation of the carriage 6 are terminated and the printing of the succeeding line is carried out by repeating the steps described above.

Although, in the above embodiment, a motor was used as the driving source of the mechanism for the up- and downward movement of the thermal head, it is obvious that another driving source, e.g. a solenoid, etc. may be used therefor. Further the movement of the carriage described above is not restricted to the returning thereof. For example, in the case where there is a region greater than a predetermined length in a line, where no printing is effected, this may be applied to the so-called ribbon saving, for which the thermal head is held up and the rewinding of the ink ribbon is stopped for that region. Still further, in addition to the operations described above, the forwarding of the sheet may be started in the course of the upward movement of the thermal head.

According to the present embodiment, since the upward movement of the thermal head and the movement of the carriage are partially overlapped with each other, it is possible to intend to shorten the total time and thus to raise the effective printing speed. For example, heretofore, the movement of carriage was started, after the upward movement of the head had been effected in 0.6 sec. On the contrary, in the present embodiment, the necessary time can be shortened by 0.3 sec for the printing of every line.

Figure 2:
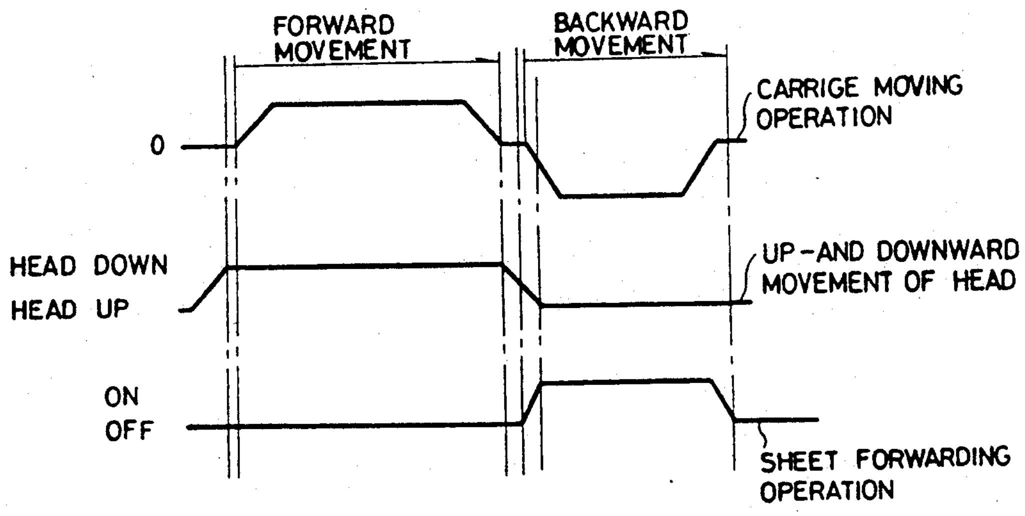
FIG. 2 is a scheme for explaining the operation timing of a second embodiment of the present invention.

Next, FIG. 2 shows the second embodiment of the present invention, which is an example, in which the thermal printer is so driven and controlled that the upward movement of the thermal head and the sheet forwarding operation are overlapped with each other.

The operation timing of the printer in the present embodiment is as follows, as indicated in FIG. 2. At first, the motor 22 for the up- and downward movement of the thermal head is driven so that the thermal head 7 is thrust on the platen 2 with a predetermined pressure (head down). In this state, while driving the motor 11 for driving the carriage so that the carriage 6 is moved along the platen 2 and at the same time the ribbon rewinding motor 25 so as to rotate the rewinding bobbin 24 in order to rewind the ink ribbon in the ribbon cassette mounted on the carriage 6, desired printing is effected on the print sheet by driving the thermal head 7 on the basis of desired recording signals. When the last printing of one line is terminated, starting from this point of time, the thermal head is moved while being thrust on the platen 2 so that the ink ribbon is peeled off from the sheet and rewound. After the movement of the carriage 6 has been completely stopped, the thermal head 7 is detached from the platen 2 (head up). (Up to this point the present method is identical to the prior art method for driving and controlling the thermal printer). Thereafter, at the point of time where thermal head 7 is detached from the platen 2 by this upward movement of the head, the sheet forwarding roller 9 is driven so as to start the sheet forwarding and at the same time the carriage driving motor 11 is driven so as to start the returning movement of the carriage to the home position side. In this way, the thermal head 7 terminates completely its upward movement in the course of the sheet forwarding operation. For this reason, the necessary time can be shortened by about 0.4 sec by starting the sheet forwarding operation in the course of the upward movement, e.g. about 0.2 sec after the beginning of the movement, contrarily to the fact that the sheet forwarding operation was stated heretofore after about 0.6 sec required for the upward movement of the thermal head 7.

In addition to the embodiment described above, the returning operation of the carriage may be started in the course of the upward movement of the thermal head.

Figure 3:
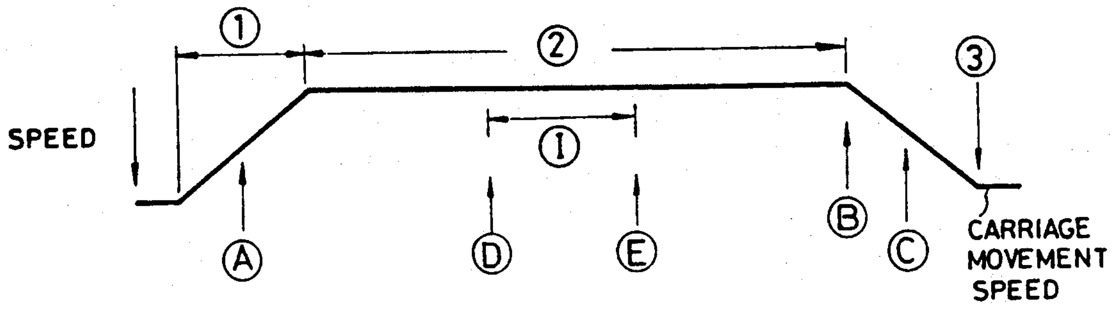
FIG. 3 is a scheme for explaining the operation timing of a third embodiment of the present invention.

Next, FIG. 3 shows the third embodiment of the invention, which is an example, in which the thermal printer is so driven and controlled that the moving operation of the carriage and the up- and/or downward movement of the thermal head are overlapped with each other.

The operation timing of the printer in the present embodiment is as follows, as indicated in FIG. 3. At first, the motor 11 for driving the carriage is driven so as to move the carriage 6 along the platen 2. When the carriage 6 (the motor 11) is in the speed-up state (①), the motor 22 for the up- and downward movement of the thermal head is driven so that the thermal head 7 is thrust on the platen 2 with a predetermined pressure (Ⓐ). In this state, where the thermal head 7 is thrust on the platen 2 with pressure, while moving the carriage 6 with a constant speed (②), desired printing is effected on the print sheet by driving the ribbon rewinding motor 25 to rotate the rewinding bobbin 24 in order to rewind the ink ribbon in the ribbon cassette mounted on the carriage 6 and at the same time by driving the thermal head 7 on the basis of desired recording signals. Then, when the last printing of one line is terminated (Ⓑ), at the point of time, where the ink ribbon is peeled off from the sheet, the drive of the ribbon rewinding motor 25 is stopped and at the same time the motor 22 for the up- and downward movement of the thermal head is driven so that the thermal head 7 is detached from the platen 2 (Ⓒ). Thereafter the carriage 6 is stopped by stopping the motor 11 for driving the carriage and thus the printing of the line is terminated (③). Subsequently the carriage 6 is returned to its home position by rotating the motor 11 for driving the carriage in the backward direction and at the same time the sheet forwarding roller 9 is rotated to effect a predetermined sheet forwarding. In this way, the printing of the succeeding line is prepared.

Although, in the above explanation, the relation between the up- and downward movement of the head and the movement of the carriage at the beginning and the ending of the printing of one line was explained, in which in the case where there is a space in the relevant line, where there is nothing to be printed, (Ⓘ), for the purpose of the so-called ribbon saving, the head is raised up and the rewinding of the ribbon is stopped and the succeeding printing is effected by bringing down again the head and rewinding the ribbon, it is possible also in this case to effect the up- and downward movement of the head in the course of the movement of the carriage (Ⓓ and Ⓔ).

Figure 4:
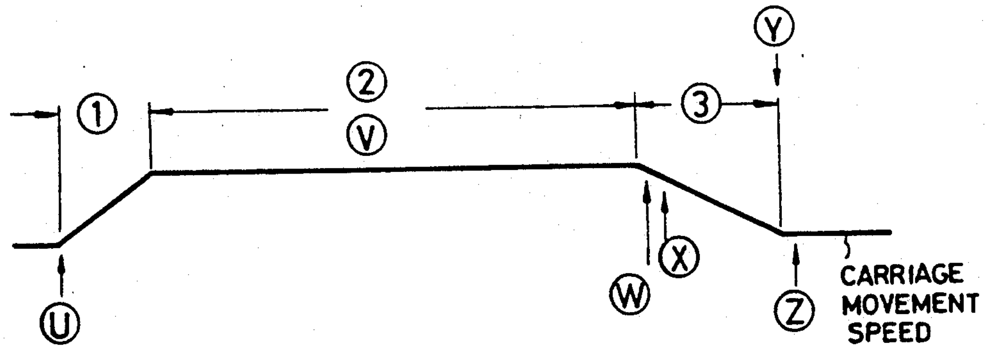
FIG. 4 is a scheme for explaining the operation timing of a fourth embodiment of the present invention.
Figure 5:
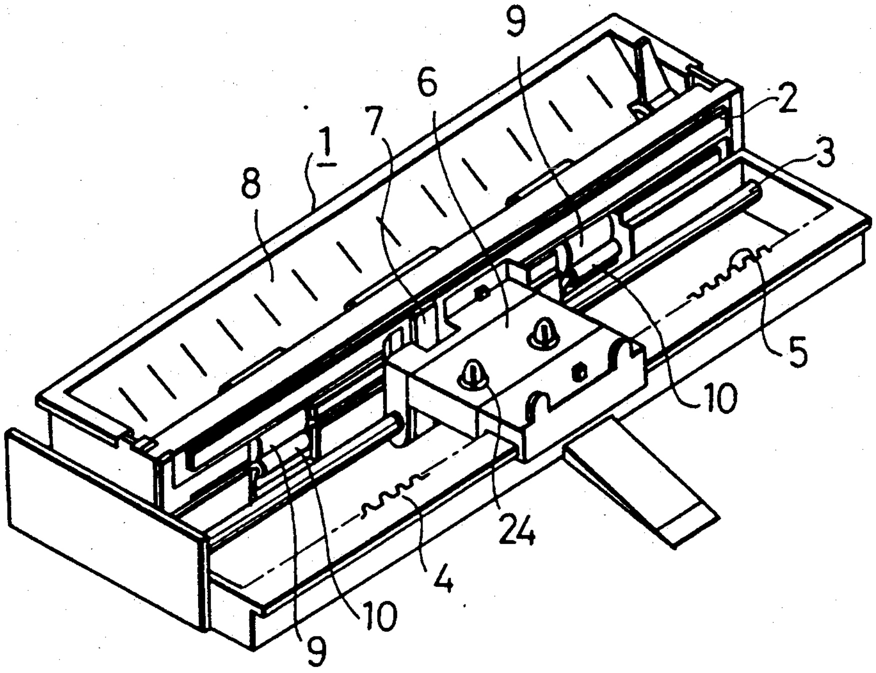
PRIOR ART Fig.5
FIG. 5 is a perspective view showing a general thermal printer.
Figure 6:
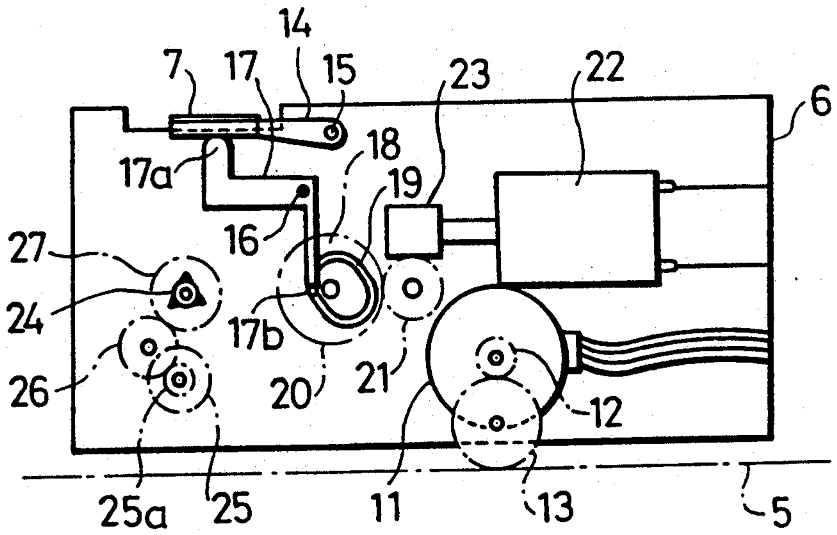
PRIOR ART Fig.6
FIG. 6 is a scheme indicating the construction of the mechanism for moving upward and downward the thermal head; the carriage driving mechanism; and the ink ribbon rewinding mechanism.

Next FIG. 4 shows the fourth embodiment of the present invention, which is an example, in which the upward movement of the thermal head and the moving operation of the carriage are overlapped with each other, and also since the rewinding of the ink ribbon is stopped at the point of time, where the current flow through the thermal head on the basis of the recording signal is stopped, and thereafter the upward movement of the thermal head is effected while moving the carriage, the draw out of the ink ribbon by the ink ribbon rewinding operation is stopped at the point of time, where the current flow through the thermal head is terminated, and as the result it is possible to prevent contamination of the print sheet produced by the fact that the ink ribbon is slipped on the print sheet.

The operation timing of the printer in the present embodiment is as follows, as indicated in FIG. 4. At first, the motor 22 for the up- and downward movement of the thermal head is driven so that the thermal head 7 is thrust on the platen 2 with a predetermined pressure (Ⓤ). In this state, while driving the motor 11 for driving the carriage so that the carriage 6 is moved with a constant speed along the platen from the speed-up state (①) and at the same time by rewinding the ink ribbon in the ribbon cassette mounted on the carriage 6 by driving the ribbon rewinding motor 25 to rotate the ink ribbon rewinding bobbin 24, desired printing is effected on the print sheet by driving the thermal head 7 on the basis of the desired printing recording signal (②Ⓥ). When the last printing of one line is terminated, at the point of time, where the ink ribbon is peeled off from the sheet, the ink ribbon rewinding operation is stopped by stopping the drive of the ribbon rewinding motor 25 (Ⓦ). Thereafter the thermal head 7 is detached from the platen 2 (Ⓧ). At this time, the carriage 7 is in the slow down state because of the drive of the carriage driving motor 11 (③) and it is stopped, after it has been displaced further by a predetermined distance (Ⓨ).

Then, after the carriage 7 has been stopped, the ribbon rewinding motor 25 is again driven in order to rewind loosened excessive ink ribbon ((Z)). In this way the printing of the line is terminated.

According to the present embodiment, since the rewinding of the ribbon is stopped, while the carriage is still moving in the slow-down region, when current flow through the thermal head is terminated, and thereafter the thermal head is detached from the platen, it is possible to prevent contamination of the print sheet produced by the fact that the ink ribbon is drawn out also after the termination of the printing operation and that this ink ribbon is slipped on the print sheet.

Although, in the embodiment described above, a thermal printer, which is so constructed that the motor for driving the carriage, the motor for moving up- and downward the head and the ribbon rewinding motor are disposed separately, was explained, the invention disclosed in the present application is not restricted thereto, but it can be applied of course to a thermal printer, in which e.g. the mechanism for moving up- and downward the head and the mechanism for rewinding the ribbon are controlled independently from each other, even if they are driven by one motor in common.

Further, although, in the embodiments described above, explanation has been made, taking a thermal transfer type thermal printer using an ink ribbon and effecting the printing by transferring ink to a sheet by means of a thermal head as an example, it is a matter of course that the driving method according to the present invention can be applied also to a type of thermal printers, by which no ink ribbon is used and the printing is effected by bringing the thermal head directly into contact with heat sensitive recording paper, etc.

As explained above, according to the present invention, the upward movement and/or the downward movement of the thermal head and the moving operation of the carriage or the sheet forwarding operation are effected, overlapped with each other, and as the result, the time required for the printing operation by means of the printer is remarkably shortened as a whole. In this way, it is possible to raise the effective printing speed significantly.

Further, according to the present invention, since the rewinding of the ink ribbon is stopped, while the carriage is still moving in the slow-down region, when current flow through the thermal head is stopped, and thereafter the thermal head is detached from the platen, not only the ink ribbon is not slipped on the print sheet after the termination of the printing operation so that it is possible to prevent contamination of the print sheet, but also a remarkable effect can be obtained that even if heat is accumulated in the thermal head and there is remaining heat, ink on the ink ribbon is never melted and therefore it is never transferred to the print sheet.

What is claimed is:

1. An improved method for driving and controlling a thermal printer having a carriage movement operation for effecting movement of a carriage forward or backward along a platen; and a thermal head movement operation for effecting movement of a thermal head against or away from said platen, said thermal head being operably disposed on said carriage;

said improved method comprising the step of initiating said carriage movement operation to move said carriage to a predetermined succeeding location along said platen after initiating said thermal head movement operation to move said thermal head away from said platen, but before completing said thermal head movement operation.

2. A method of claim 1 wherein said thermal head movement operation is initiated to move said thermal head away from said platen and said carriage movement operation is initiated to move said carriage to a position determining a beginning of a new printing line.

3. A method of claim 1 wherein, while said carriage is moving along a printing line, said thermal head movement operation is initiated to move said thermal head away from said platen and said carriage movement operation is initiated to move said carriage to a position determining an intermediate location of said printing line.

4. An improved method for driving and controlling a thermal printer having a carriage movement operation for effecting movement of a carriage forward or backward along a platen; and a thermal head movement operation for effecting movement of a thermal head against or away from said platen, said thermal head being operably disposed on said carriage;

said improved method comprising the step of initiating said thermal head movement operation to move said thermal head against said platen after initiating said carriage movement operation to move said carriage along said platen, but completing said thermal head movement operation before said carriage has attained a constant speed.

5. An improved method for driving and controlling a thermal printer having a carriage movement operation for effecting movement of a carriage along a platen, said carriage movement operation consisting of a forward speed period and a backward speed period;

a thermal head movement operation for effecting movement of a thermal head against or away from said platen, said thermal head being operably disposed on said carriage; and a sheet forwarding operation for positioning a printing sheet between said platen and said carriage such that said sheet forwarding operation advances said sheet a predetermined distance in a direction perpendicular to said movement of said carriage;

said improved method comprising the steps of:

initiating said thermal head movement operation to move said thermal head away from said platen;

initiating said backward speed of said carriage movement operation to move said carriage to a position determining a beginning of a new printing line and substantially simultaneously initiating said sheet forwarding operation to forward said printing sheet said predetermined distance;

such that said carriage movement operation and said sheet forwarding operation are initiated after said initiation of said thermal head movement operation and before the completion of said thermal head movement operation.

6. An improved method for driving and controlling a thermal printer having a carriage movement operation for effecting movement of a carriage forward or backward along a platen, said carriage movement operation consisting of a constant forward speed period, a slowing down period during which said carriage slows from said constant forward speed period to a stopped position, and a backward speed period;

a thermal head movement operation for effecting movement of a thermal head against or away from said platen, said thermal head being operably disposed on said carriage; and an ink ribbon rewinding operation for causing an ink ribbon to pass in front of said thermal head between said thermal head and said platen;

said improved method comprising:

initiating said slowing down period of said carriage movement operation to move said carriage to a predetermined succeeding location along said platen;

initiating said thermal head movement operation to move said thermal head away from said platen after initiating said slowing down period of said carriage movement operation, but before said carriage is in said stopped position; and terminating said ink ribbon forwarding operation after initiating said thermal head movement operation, but before said carriage is in said stopped position.

7. An improved method for driving and controlling a thermal printer having a carriage movement operation wherein movement of a carriage changes from forward to backward along a platen, or movement of the carriage changes from backward to forward along the platen; and a thermal head movement operation wherein movement of a thermal head changes from against to away from the platen, or movement of the thermal head changes from away to against the platen, said thermal head being operably disposed on said carriage;

said improvement comprising the step of overlapping said carriage movement operation with said thermal head movement operation.

8. An improved method for driving and controlling a thermal printer having a carriage movement operation wherein movement of a carriage changes from forward to backward along a platen, or movement of the carriage changes from backward to forward along the platen;

a thermal head movement operation wherein movement of a thermal head changes from against to away from the platen, or movement of the thermal head changes from away to against the platen, said thermal head being operably disposed on said carriage; and a sheet forwarding operation for positioning a printing sheet between said platen and said carriage such that said sheet forwarding operation advances said sheet a predetermined distance in a direction perpendicular to said movement of said carriage;

said improvement comprising the step of overlapping said carriage movement operation, said thermal head movement operation, and said sheet forwarding operation.

9. An improved method for driving and controlling a thermal printer having a carriage movement operation wherein movement of a carriage changes from forward to backward along a platen, or movement of the carriage changes from backward to forward along the platen; and a thermal head movement transition operation wherein movement of a thermal head changes from against to away from the platen, or movement of the thermal head changes from away to against the platen, said thermal head being operably disposed on said carriage;

an ink ribbon rewinding operation wherein an ink ribbon passes in front of said thermal head between said thermal head and said platen;

said improvement comprising the step of overlapping said carriage movement operation, said thermal head movement operation, and initiation or termination of said ink ribbon forwarding operation.

* * * * *